United States Patent
Liu et al.

(10) Patent No.: US 8,149,900 B2
(45) Date of Patent: Apr. 3, 2012

(54) LOW COMPLEXITY ACQUISITION METHOD FOR GNSS

(75) Inventors: Dong-hong Liu, Changhua (TW); Hen-wai Tsao, Taipei (TW)

(73) Assignee: MEDIATEK Inc., Hsin-Chu (TW)

( * ) Notice: Subject to any disclaimer, the term of this patent is extended or adjusted under 35 U.S.C. 154(b) by 575 days.

(21) Appl. No.: 12/417,521

(22) Filed: Apr. 2, 2009

(65) Prior Publication Data

US 2010/0254438 A1    Oct. 7, 2010

(51) Int. Cl.
*H04B 1/00* (2006.01)
*G01S 19/24* (2010.01)

(52) U.S. Cl. ..... 375/150; 375/142; 375/343; 342/357.63

(58) Field of Classification Search ............. 375/142, 375/147, 150, 343; 342/357.39, 357.51, 342/357.63, 357.71
See application file for complete search history.

(56) References Cited

U.S. PATENT DOCUMENTS 7,649,494 B2 *  1/2010  Matsumoto et al. ..... 342/357.63
7,688,261 B2 *  3/2010  DiEsposti ............... 342/357.64

OTHER PUBLICATIONS

Jan et al., "A New Multi-C/A Code Acquisition Method for GPS", Mar. 24, 2009, GPS Solutions, vol. 13, No. 4, pp. 293-303.*
G.Waelchli, G.Zamuner+, D.Manetti, M.Frei, F.Chastellain, E.Firouzi, C.Botteron, P-A.Farine; Development, implementation and validation of a real-time Galileo E1-B signal acquisition and tracking scheme; Institute of Microtechnology (IMT), University of Neuchâtel, Switzerland.; P.Brault, Martec Serpe-Iesm, France.
Yao-Cheng Lin, Chih-Cheng Sun; An Innovative Acquisition Method for the GPS and Galileo Combined Signal; Department of Aeronautics and Astronautics National Cheng Kung University; Tainan Taiwan.
Weihua Zhuang; Noncoherent Hybrid Parallel PN Code Acquisition for CDMA Mobile Communications; IEEE Transactions on Vehicular Technology, vol. 45, No. 4, Nov. 1996.

* cited by examiner

*Primary Examiner* — David B. Lugo
(74) *Attorney, Agent, or Firm* — Kirton McConkie; Evan R. Witt

(57) ABSTRACT

A low complexity acquisition method and a receiver implemented such a method are disclosed. In the present invention, a cyclical shifted-and-combined (CSC) code is generated by intercepting sub-codes from a full code and combining the sub-codes with an equal gain. The CSC code is correlated with a received signal to find a candidate peak. The other candidate peak(s) can be deduced accordingly. Thus, hypotheses can be significantly reduced. A true peak can be easily and rapidly found by verifying the candidate peaks.

17 Claims, 5 Drawing Sheets

LOW COMPLEXITY ACQUISITION METHOD FOR GNSS

TECHNICAL FIELD OF THE INVENTION

The present invention relates to satellite communication, more particularly, to a low complexity acquisition method for GNSS (Global Navigation Satellite System).

BACKGROUND OF THE INVENTION

In modernized GNSS, some systems use long codes. For example, Galileo system uses a code with a length of 4 ms, which is four times of that of GPS L1C, in which the code length is 1 ms.

To acquire a satellite, a receiver must correlate a received signal with a full code. In Galileo, the full code has the length of 4 ms as mentioned above, that is, 4092 chips. Accordingly, the acquisition time is long, thereby negatively influencing the time-to-first-fix (TTFF), which is an important index for the receiver performance.

SUMMARY OF THE INVENTION

In accordance with the present invention, An acquisition method for GNSS comprises partially intercepting sections of a full code consisting of code phase shifts to generate a plurality of sub-codes, the respective code phase shifts equally appearing in the overall sub-codes; combining the sub-codes to generate a new code; correlating the new code with a received signal to obtain a candidate peak; deducing other candidate peaks with respect to the obtained candidate peak; and verifying all candidate peaks to obtain a true peak. In one embodiment, the full code is equally divided into the sub-codes and the sub-codes are not overlapped with each other. In another embodiment, adjacent two sub-codes are partially overlapped.

A GNSS receiver according to the present invention comprises a code generator for generating a full code; a cyclic shifted-and-combined (CSC) code generator receiving the full code, partially intercepting sections of a full code consisting of code phase shifts to generate a plurality of sub-codes and combining the sub-codes to generate a new code; a correlation unit for correlating the CSC code with a received signal; and a decision unit for determining a candidate peak according to correlation results of the CSC code with the received signal to deduce other candidate peaks with respect to the obtained candidate peak and verifying all of the candidate peaks to obtain a true peak. The respective code phase shifts equally appearing in the overall sub-codes

BRIEF DESCRIPTION OF THE DRAWINGS

The present invention will be described in detail in conjunction with the appending drawings, in which.

DETAILED DESCRIPTION OF THE INVENTION

Galileo code will be discussed as an example in the following descriptions. As mentioned, a full Galileo code x of 4 ms comprises 4092 chips: The correlation function of the full code with a received signal y is as follows:

$$V_l = \sum_{n=0}^{N-1} y_n x_{((n+l))_N}; 0 \le l \le N-1 \quad (1)$$

where $((k))_N = k \bmod N$;

N is the chip number of the full code, which is 4092 in this case;

$V_l$ is the correlation result;

$x_n$ is the $(n-1)^{th}$ chip (code phase shift) of the local full code;

$y_n$ is the $(n-1)^{th}$ chip (code phase shift) of received signal.

In the present invention, the full code x is divided into a plurality of sub-codes xi. Assuming the full code length is L (e.g. L=4092 chips), and is divided into M parts (e.g. M=2), then each sub-code has a length of L/M (e.g. L/2 when M=2). The sub-codes xi are combined with an equal gain into a new code x', which is referred to as a cyclical shifted-and-combined code (CSC code) hereinafter. If the CSC code has a length of L/2, the correlation function is:

$$V'_l = \sum_{n=0}^{\frac{N}{2}-1} y_n x'_{((n+l))_{\frac{N}{2}}} + \sum_{n=\frac{N}{2}}^{N-1} y_n x'_{((n+l))_{\frac{N}{2}}}; 0 \le l \le \frac{N}{2}-1 \quad (2)$$

where $((k))_N = k \bmod N$;

N is the chip number of the full code, which is 4092 in this case;

$V_l$ is the correlation result;

$x'_n$ is the $(n-1)^{th}$ chip(code phase shift) of the local CSC code;

$y_n$ is the $(n-1)^{th}$ chip(code phase shift) of received signal.

Figure 1:
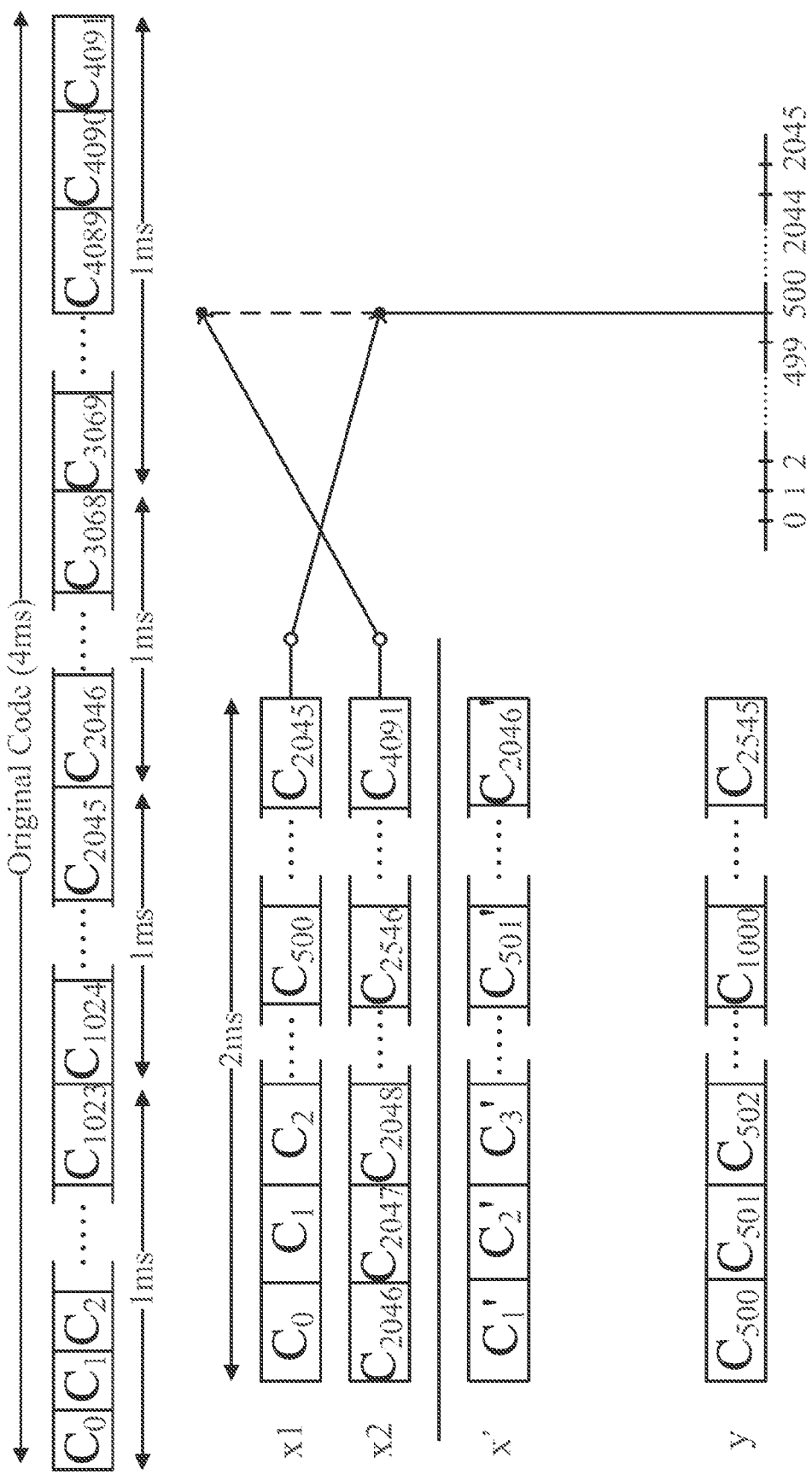
FIG. 1 is a schematic illustration showing an embodiment of the present invention, in which a set of sub-codes without overlapping are generated and combined into a cyclical shifted-and-combined (CSC) code.

FIG. 1 is a schematic illustration showing an embodiment of the present invention. In this example, a full code of 4092 chips (i.e. N=4092). That is, the original code x=[$C_0$, $C_1$, ..., $C_{N-1}$]=[$C_0$, $C_1$, ..., $C_{1023}$, $C_{1024}$, ..., $C_{2045}$, $C_{2046}$, ..., $C_{3068}$, $C_{3069}$, ..., $C_{4089}$, $C_{4090}$, $C_{4091}$]. This full code x is divided into to 2 sub-codes x1 and x3 (i.e. M=2), where x1=[$C_0$, $C_1$, ..., $C_{N/2-1}$]=[$C_0$, $C_1$, ..., $C_{1023}$, $C_{1024}$, ..., $C_{2045}$], and x3=[$C_{N/2}$, ..., $C_{N-1}$]=[$C_{2046}$, ..., $C_{3068}$, $C_{3069}$, ..., $C_{4089}$, $C_{4090}$, $C_{4091}$], each of which has a length of 2046 chips (4092/2=2046), that is, 2 ms. The sub-codes x1 and x3 are combined to form a new code (i.e. the CSC code) x', x'=[$C'_1$, ..., $C'_{1023}$, $C'_{1024}$, ..., $C'_{2046}$]. The combination of x1 and x3 is performed by simply adding the two sub-codes with an equal gain.

In this example, a signal y=[$C_{500}$, $C_{501}$, $C_{502}$, ...] is received. If the conventional acquisition method is used, the correlation function for the full code of 4 ms with the received code is as equation (1). If the acquisition method of the present embodiment is used, the correlation function will be equation (2), which can be further deduced as:

$$V'_l = \sum_{n=0}^{N-1} y_n x'_{((n+l))_N}; 0 \le l \le \frac{N}{2} - 1 \quad (3)$$

$$= \sum_{n=0}^{\frac{N}{2}-1} y_n(x1 + x3)_{((n+l))_{\frac{N}{2}}}$$

$$= \sum_{n=0}^{\frac{N}{2}-1} y_n x1_{((n+l))_{\frac{N}{2}}} + y_n x3_{((n+l))_{\frac{N}{2}}}$$

where V'$_l$ is the correlation result;

If it is determined that the correlation peak is located on code phase shift i by correlating the received signal with the full code, then the correlation peak will be located on code phase shift $((i))_{N/2}$ by correlating the received signal with the CSC code according to the present embodiment of the present invention. However, since the CSC code only has a half length as compared to the full code, the true peak may fall on the code phase shift $((i))_{N/2}+N/2$ rather than $((i))_{N/2}$.

In this example, when the true peak falls on the code phase shift 500 ($C_{500}$) or the code phase shift 2546 ($C_{2546}$), the correlation result of the received signal with the CSC code, of which the length is 2046 chips, will indicate that the code phase shift of the peak is 500 ($C_{500}$). Therefore, it is necessary to verify which one of $C_{500}$ and $C_{2546}$ is the true peak code phase shift. To verify these two specific hypotheses, these two code phase shifts are correlated with the original full code having 4092 chips. Once the true peak is verified, the acquisition is accomplished.

Since the length of the CSC code is only a half of the full code in this example, the complexity of correlation calculation is reduced, so that the speed is much faster. Even the verification for the two specific hypotheses (e.g. code phase shifts 500 and 2546) are executed, the total required time to find the peak by using the CSC code is much shorter than using the full code.

Figure 2:
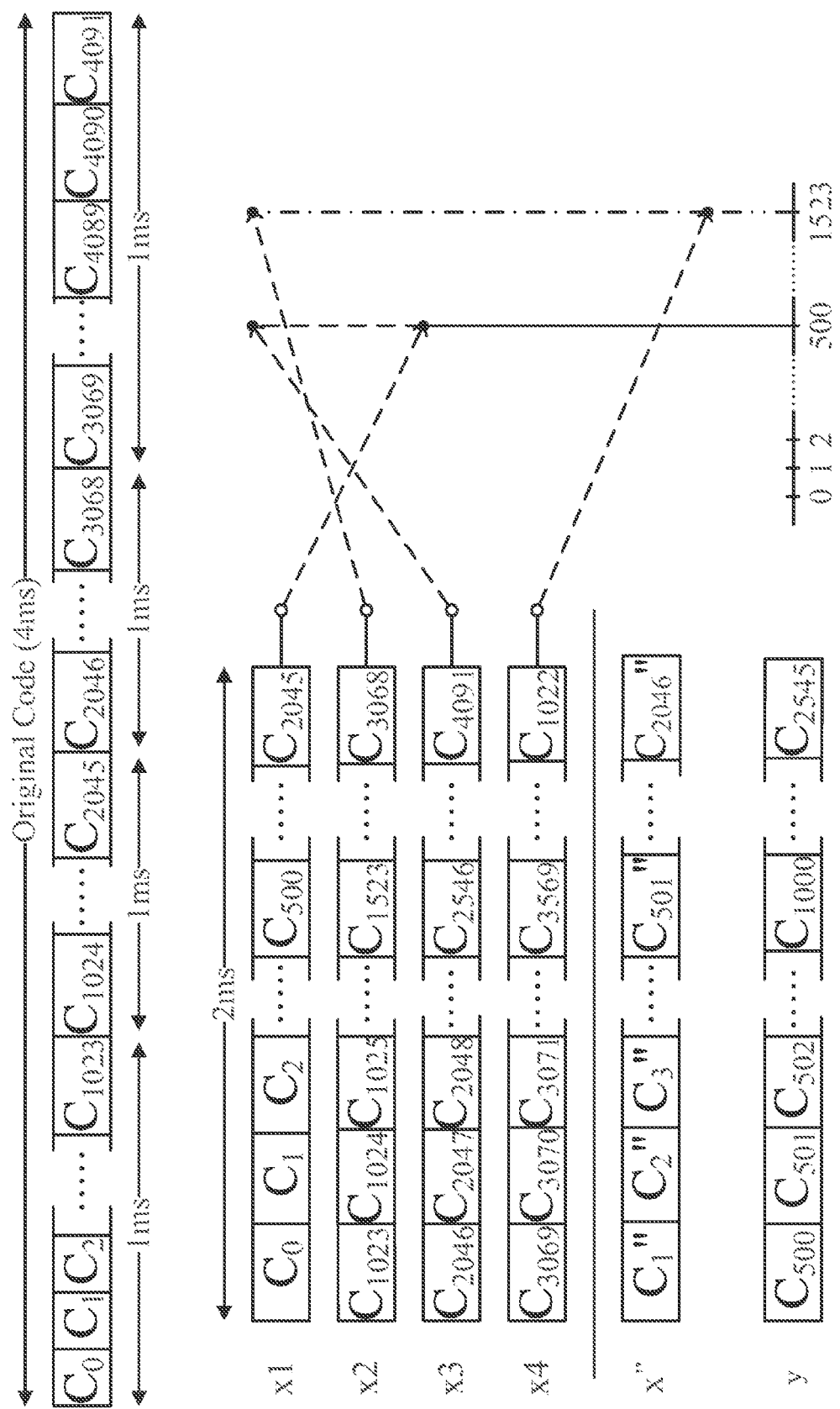
FIG. 2 is a schematic illustration showing another embodiment of the present invention in which a set of sub-codes with overlapping are generated and combined into a cyclical shifted-and-combined (CSC) code.

FIG. 2 is a schematic illustration showing another embodiment of the present invention. In the present embodiment, to further speed up the acquisition, four sub-codes x1, x2, x3, x4 are intercepted from the full code x. As the previous embodiment, the original full code x has the length of 4092 chips, that is, $x=[C_0, C_1, \ldots, C_{N-1}]=[C_0, C_1, \ldots, C_{1023}, C_{1024}, \ldots, C_{2045}, C_{2046}, \ldots, C_{3068}, C_{3069}, \ldots, C_{4089}, C_{4090}, C_{4091}]$. Each of the sub-codes x1, x2, x3, x4 has a length of 2046 chips, in which $x1=[C_0, C_1, \ldots, C_{2045}]$; $x2=[C_{1023}, C_{1024}, \ldots, C_{3068}]$; $x3=[C_{2046}, C_{2047}, \ldots, C_{4091}]$; $x4=[C_{3069}, C_{3070}, \ldots, C_{1022}]$. Each sub-code is shifted a length of N/4 with respect to the previous sub-code. As can be seen, every two successive sub-codes have a portion of chips overlapped. In the present invention, the overlapping portion is set to have a length of N/4=4092/4=1023 chips. That is, sub-code x1 has a latter half to be overlapped with a former half of sub-code x2; sub-code x2 has a latter half to be overlapped with a former half of sub-code x3; sub-code x3 has a latter half to be overlapped with a former half of sub-code x4; and sub-code x4 has a latter half to be overlapped with a former half of sub-code x1, as shown in the drawing. Then the four sub-codes x1 to x4 are combined with an equal gain to form a new CSC code x", $x"=[C"_1, \ldots, C"_{1023}, C"_{1024}, \ldots, C"_{2046}]$.

In this example, a signal $y=[C_{500}, C_{501}, C_{502}, \ldots]$ is received. If the conventional acquisition method is used, the correlation function for the full code of 4 ms with the received code is as equation (1). If the acquisition method of the present embodiment is used, the correlation function will be equation (2), which can be further deduced as:

$$V''_l = \sum_{n=0}^{N-1} y_n x''_{((n+l))_N}; 0 \le l \le \frac{N}{2} - 1 \quad (4)$$

$$= \sum_{n=0}^{\frac{N}{2}-1} y_n(x1 + x2 + x3 + x4)_{((n+l))_{\frac{N}{2}}}$$

$$= \sum_{n=0}^{\frac{N}{2}-1} y_n x1_{((n+l))_{\frac{N}{2}}} + y_n x2_{((n+l))_{\frac{N}{2}}} + y_n x3_{((n+l))_{\frac{N}{2}}} + y_n x4_{((n+l))_{\frac{N}{2}}}$$

where V'$_l$ is the correlation result;

If it is determined that the correlation peak is located on code phase shift i by correlating the received signal with the full code, then the correlation peaks will be located on code phase shift $((i))_{N/4}$ and $((i))_{N/4}+N/4$ by correlating the received signal with the CSC code according to the present embodiment of the present invention. However, since the CSC code only has a half length as compared to the full code, the true peak may fall on the one of code phase shifts $((i))_{N/4}$, $((i))_{N/4}+N/4$, $((i))_{N/4}+N/2$ or $((i))_{N/4}+3N/4$.

In this example, when the true peak falls on the code phase shift 500 ($C_{500}$), 1523 ($C_{1523}$), 2546 ($C_{2546}$) or the code phase shift 3569 ($C_{3569}$), the correlation result of the received signal with the CSC code, of which the length is 2046 chips, will indicate that peaks fall at the code phase shifts 500 ($C_{500}$) and 1523 ($C_{1523}$). Therefore, it is necessary to verify which one of $C_{500}$, $C_{1523}$, $C_{2546}$, and $C_{3569}$ is the true peak code phase shift. To verify these four specific hypotheses, these four candidate code phase shifts are correlated with the original full code having 4092 chips. Once the true peak is verified, the acquisition is accomplished.

As can been seen, the two peaks found by using the method of the present embodiment has a specific relationship therebetween. These two peak code phase shifts differ by 1023 chips (i.e. N/4). Therefore, in practice, it is only necessary to perform correlation for N/4 of the received signal with the CSC code, one of the four candidate peaks can be found. That is, one of the four candidate code phase shifts can be determined. As discussed above, there is a specific relation ship among the four candidate code phase shifts. Once one candidate code phase shift is determined, the other three candidate code phase shifts can be simply determined accordingly without correlation computation. Thus, the calculation complexity is further reduced and the acquisition can be further speeded up. As described above, these four candidate code phase shifts are verified to determine which one is the true peak. Table 1 shows the complexity comparison of multiplication and addition operations in correlation computation between the condition in which the full code is used and the condition in which the CSC code of the present embodiment is used. It is noted that a code resolution is set to be ⅛ chip, integration time is 4 ms, the full code length is 4092 chips, and an acquisition search frequency range is ±5 kHz in 250 Hz steps (i.e. 41 frequency components).

TABLE 1

Complexity comparison between full code and CSC code.

| | Multiplication | Addition |
|---|---|---|
| Full code | (4092 × 8) × (4092 × 8) × 41 = 43937473536 | (4092 × 8 − 1) × (4092 × 8) × 41 = 43936131360 |
| CSC code | (2046 × 8 × 2) × (1023 × 8) × 41 = 10984368384 | (2046 × 8 × 2 − 1) × (1023 × 8) × 41 = 10984032840 |

It is clear that the complexity is significantly decreased by using the CSC code in accordance with the present embodiment of this invention.

As described, the sub-codes are intercepted from the original full code. The respective sub-codes can be overlapped with each other or not. To partially intercept a portion of the full code as a sub-code, it is noted that orthogonality of the codes cannot be damaged too severely, so as to maintain an acceptable signal-to-noise ratio (SNR). In the case that the respective sub-codes are not overlapped with each other as in the first embodiment, it is noted that each code phase shift appears once in the overall sub-codes. In the case that the respective sub-codes are overlapped with each other as in the second embodiment, it is noted that each code phase shift should be repeated the same times (e.g. twice) in the overall sub-codes.

Figure 3:
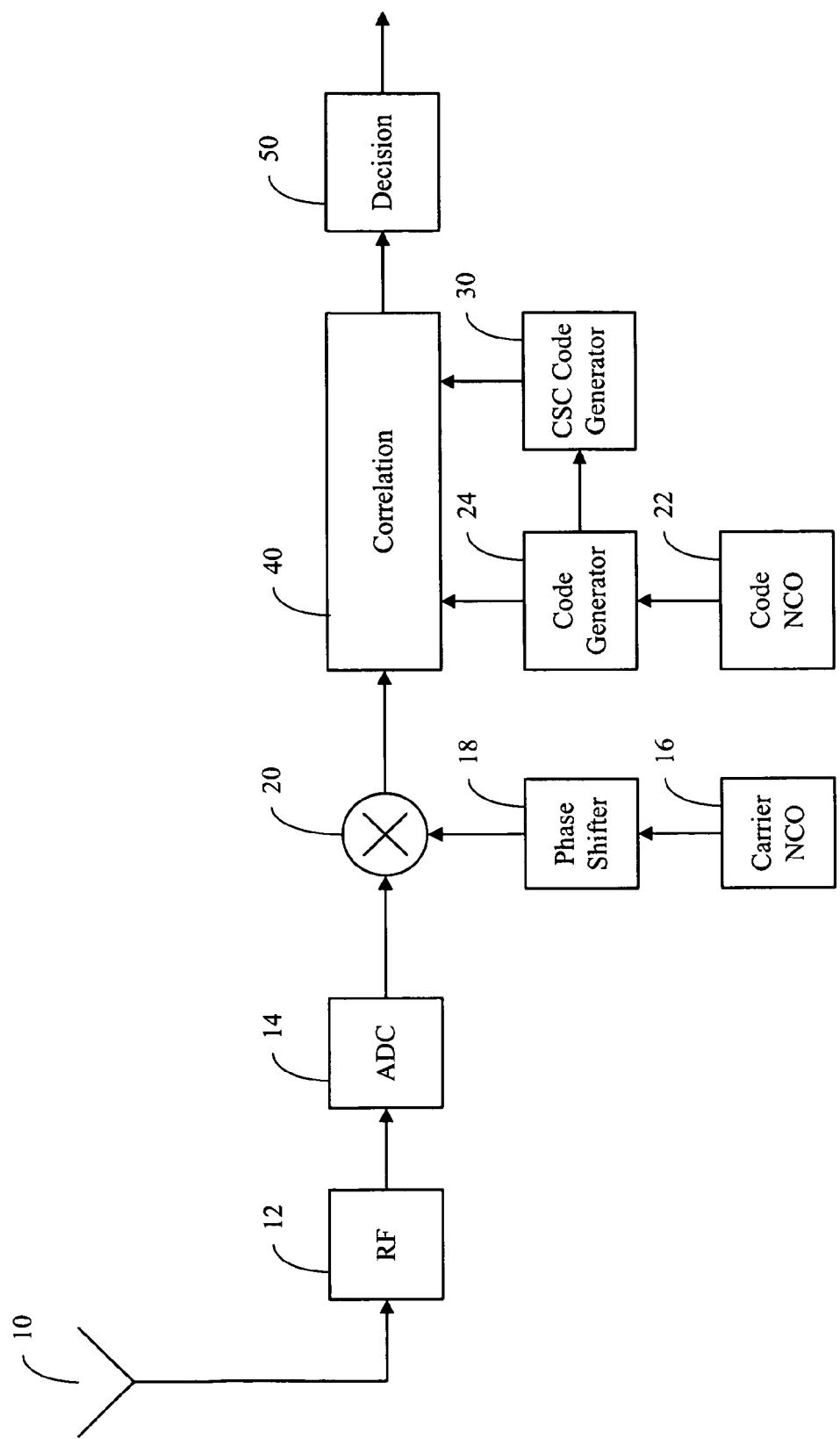
FIG. 3 is a block diagram schematically and generally showing a receiver in accordance with the present invention.

FIG. 3 is a block diagram schematically and generally showing a receiver 10 in accordance with the present invention. The receiver 10 has an antenna for receiving a signal, an RF front end 12 for performing RF relevant operations to the received signal as widely known in this field. An analog-to-digital converter (ADC) 14 converts the analog signal from the RF front end 12 into a digital form. The receiver 10 includes an IF (intermediate frequency) NCO (numeral control oscillator) 16 for providing an IF carrier. The IF carrier is passed to a phase shifter 18 to be divided into I (in-phase) and Q (quadrature) components. The I and Q components of the IF carrier are mixed with the digital signal by a mixer 20 to remove the IF to convert the signal into a complex (I and Q) baseband signal. The receiver 10 further has a code NCO 22 for providing an oscillation signal to a code generator 24 so that the code generator 24 can generate a code. This code is the original full code as described in the embodiments. The full code is passed to a correlation unit 40 to be correlated with specific hypotheses of the baseband signal. The details will be further described.

According to the present invention, the receiver 10 has a CSC code generator 30. The CSC code generator 30 receives the full code from the code generator 24 to generate a new CSC code based on the method described above. The CSC code is passed to the correlation unit 40 to be correlated with the baseband signal so as to find a candidate peak. Once the candidate peak is found, that is, a candidate peak code phase shift is determined, the determination is sent to a decision unit 50 to deduce the other candidate peak code phase shift(s). After all of the candidate code phase shifts (i.e. the specific hypotheses) are determined, these hypotheses are correlated with the full code to verify which one is the true peak. After the true peak is determined, acquisition is done, the result can be passed to successive stages.

Figure 4:
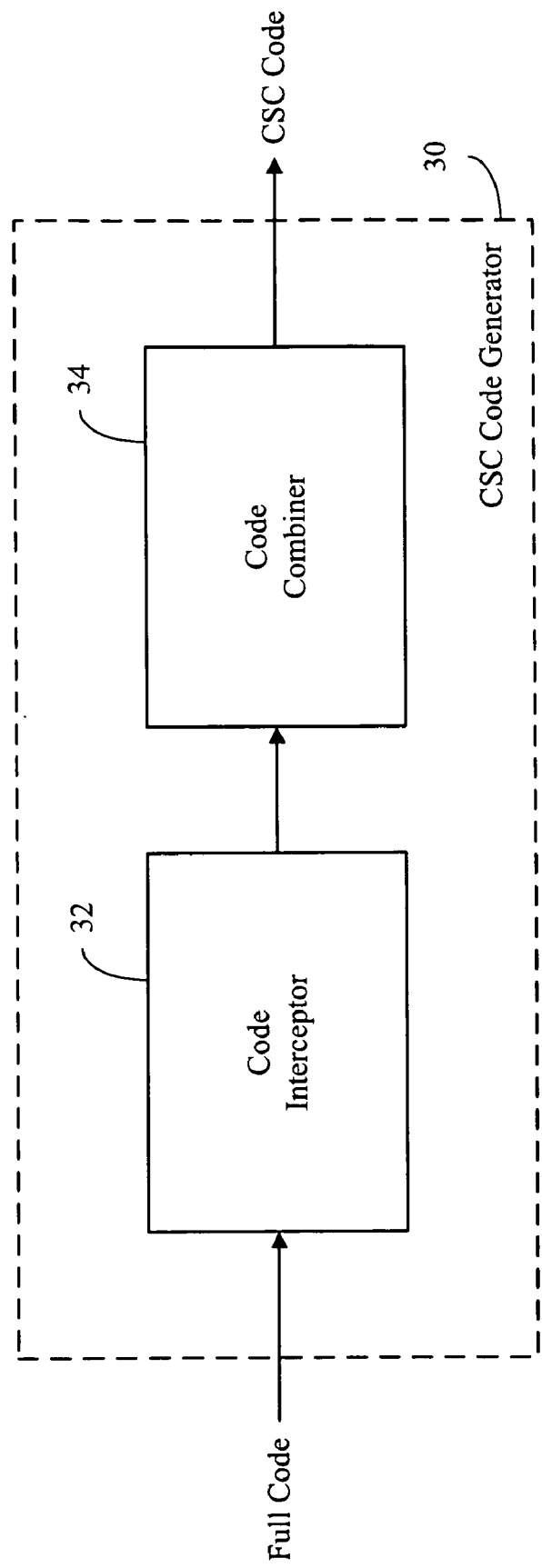
FIG. 4 is a block diagram schematically and generally showing a CSC code generator of the receiver in FIG. 3.

FIG. 4 is a block diagram schematically and generally showing the CSC code generator 30. As shown, the CSC code generator 30 has a code interceptor 32 and a code combiner 34. Taking the second embodiment as an example, the code interceptor 32 intercepts the sub-codes x1, x2, x3, x4 from the full code x. Then the code combiner 34 combines the sub-codes with an equal gain to form the CSC code x".

Figure 5:
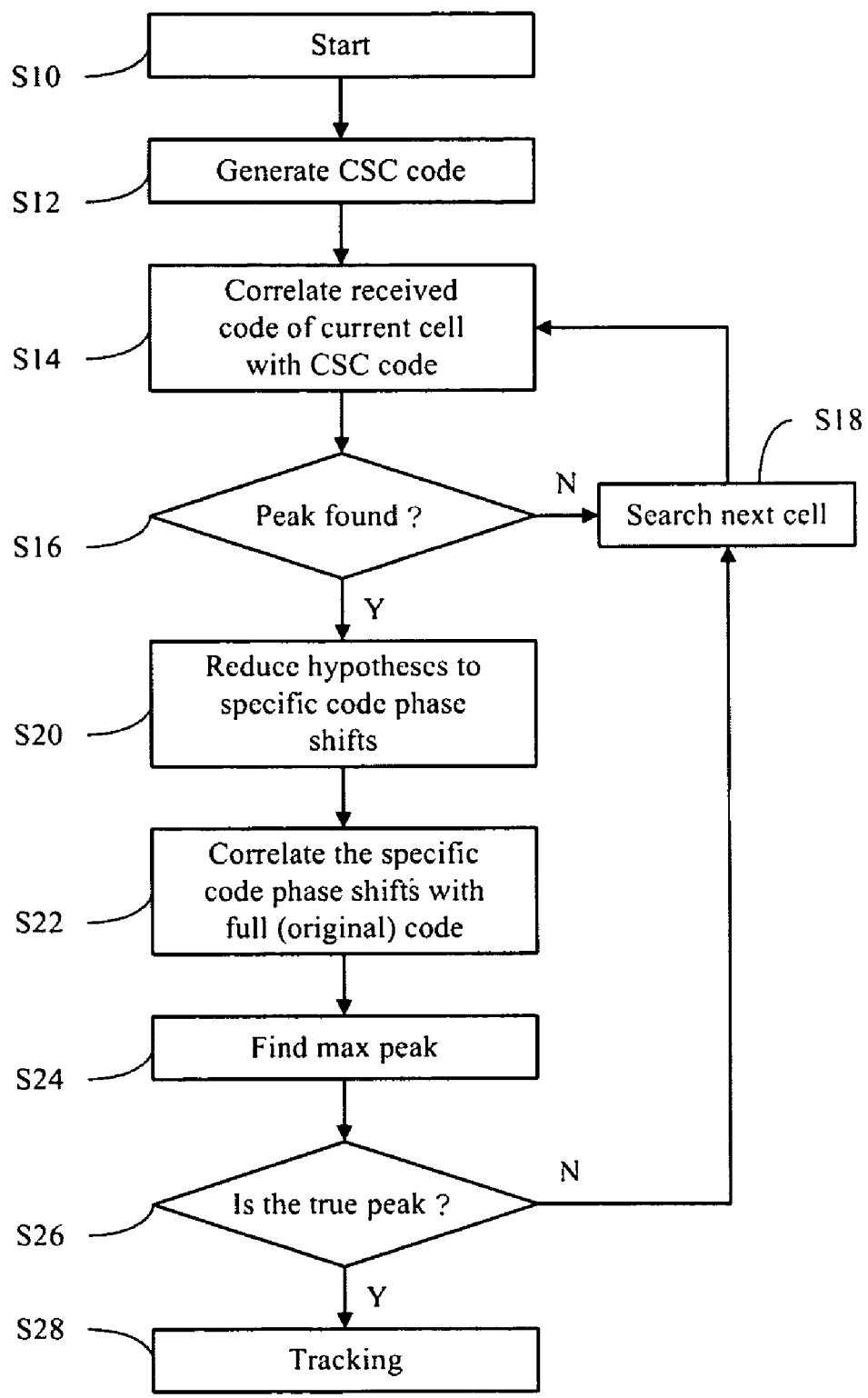
FIG. 5 is a flow chart showing an acquisition method in accordance with the present invention.

The acquisition method of the present invention can be generalized into a process as shown in the flow chart of FIG. 5. The process will be described with reference to FIG. 5 as well as FIGS. 3 and 4. The process starts at step S10. In step S12, a CSC code is generated by the CSC code generator 30 as a new code. As described above, the CSC code is generated by intercepting sub-codes from the full code and combining the sub-codes. In step S14, a received code (i.e. the code of the received signal) of a current cell is correlated with the new code to found a peak. It is noted that one cell means a section of the received signal having the same length as the CSC code. In step S16, it is determined that whether any peak is found. If not, then the next cell is searched (step S18). If one peak is found, then the hypotheses are reduced to some specific code phase shifts in step S20. In the first embodiment, the hypotheses are reduced to two specific code phase shifts. In the second embodiment, the hypotheses are reduced to four specific code phase shifts. In step S22, the specific code phase shifts are correlated with the full code to obtain respective correlation results for the specific code phase shifts. In step S24, the maximum peak is determined according to the correlation results of the specific code phase shifts with the full code. In step S26, it is double checked if the maximum peak is the true peak. If so, acquisition is done, and the process can go to step S28 for tracking the signal. If not, the process goes back to step S18 to search the next cell.

While the preferred embodiments of the present invention have been illustrated and described in detail, various modifications and alterations can be made by persons skilled in this art. The embodiment of the present invention is therefore described in an illustrative but not restrictive sense. It is intended that the present invention should not be limited to the particular forms as illustrated, and that all modifications and alterations which maintain the spirit and realm of the present invention are within the scope as defined in the appended claims.

What is claimed is:

1. An acquisition method for GNSS, the method comprising steps of:
    partially intercepting sections of a full code consisting of code phase shifts to generate a plurality of sub-codes, the respective code phase shifts equally appearing in the overall sub-codes;
    combining the sub-codes to generate a new code;
    correlating the new code with a received signal to obtain a candidate peak;
    deducing other candidate peaks with respect to the obtained candidate peak; and
    verifying all of the candidate peaks to find a true peak.

2. The method of claim 1, wherein the sub-codes are combined with an equal gain.

3. The method of claim 1, wherein the full code is equally divided into a plurality of sub-codes, the sub-codes are not overlapped with each other.

4. The method of claim 3, wherein each of the code phase shifts appears once in the overall sub-codes.

5. The method of claim 1, wherein adjacent two of the sub-codes are partially overlapped with each other.

6. The method of claim 5, wherein each of the code phase shift appears the same plural times in the overall sub-codes.

7. The method of claim 5, wherein the overlapped portion has a length which is a half of that of the sub-code.

8. The method of claim 1, wherein a code phase shift of each candidate peak is correlated with the full code in the verification step to find the true peak.

9. A GNSS receiver comprising:

a code generator for generating a full code;

a cyclic shifted-and-combined (CSC) code generator receiving the full code, partially intercepting sections of a full code consisting of code phase shifts to generate a plurality of sub-codes and combining the sub-codes to generate a CSC code, the respective code phase shifts equally appearing in the overall sub-codes;

a correlation unit for correlating the CSC code with a received signal; and a decision unit for determining a candidate peak according to correlation results of the CSC code with the received signal to deduce other candidate peaks with respect to the obtained candidate peak and verifying all of the candidate peaks to find a true peak.

10. The GNSS receiver of claim 9, wherein the CSC code generator comprises a code interceptor for partially intercepting sections of a full code consisting of code phase shifts to generate a plurality of sub-codes and a code combiner for combining the sub-codes to generate the CSC code.

11. The GNSS receiver of claim 9, wherein the CSC code generator combines the sub-codes with an equal gain.

12. The GNSS receiver of claim 9, wherein the CSC code generator equally divides the full code into a plurality of sub-codes, the sub-codes are not overlapped with each other.

13. The GNSS receiver of claim 12, wherein the CSC code generator intercepts the sub-codes so that each of the code phase shifts appears once in the overall sub-codes.

14. The GNSS receiver of claim 9, wherein the CSC code generator intercepts the sub-codes so that adjacent two of the sub-codes are partially overlapped with each other.

15. The GNSS receiver of claim 14, wherein the CSC code generator intercepts the sub-codes so that each of the code phase shift appears the same plural times in the overall sub-codes.

16. The GNSS receiver of claim 14, the CSC code generator intercepts the sub-codes so that wherein the overlapped portion has a length which is a half of that of the sub-code.

17. The GNSS receiver of claim 9, wherein the decision unit instructs the correlation unit to correlate a code phase shift of each candidate peak with the full code to find the true peak.

* * * * *